US012586040B2

(12) United States Patent　(10) Patent No.:　US 12,586,040 B2
Alurkar et al.　(45) Date of Patent:　Mar. 24, 2026

(54) WHITEBOARD EVENT COMPLIANCE

(71) Applicant: Zoom Communications, Inc., San Jose, CA (US)

(72) Inventors: Aakash Atul Alurkar, Irvine, CA (US); Stephen George Newton, San Jose, CA (US); Adi David Regev, Fair Lawn, NJ (US)

(73) Assignee: Zoom Communications, Inc., San Jose, CA (US)

( * ) Notice: Subject to any disclaimer, the term of this patent is extended or adjusted under 35 U.S.C. 154(b) by 231 days.

(21) Appl. No.: 18/451,622

(22) Filed: Aug. 17, 2023

(65) Prior Publication Data

US 2024/0037509 A1　Feb. 1, 2024

Related U.S. Application Data

(63) Continuation of application No. 17/877,891, filed on Jul. 30, 2022, now Pat. No. 11,775,935.

(51) Int. Cl.
G06Q 10/1091　(2023.01)

(52) U.S. Cl.
CPC ................................. G06Q 10/1091 (2013.01)

(58) Field of Classification Search
CPC .................................................... G06Q 10/1091
See application file for complete search history.

(56) References Cited

U.S. PATENT DOCUMENTS

| 9,507,798 B1 | 11/2016 | Zhao et al. | |
| 10,521,443 B2 | 12/2019 | Brunets et al. | |
| 10,768,885 B1 * | 9/2020 | Fieldman | H04L 65/403 |
| 11,290,783 B2 | 3/2022 | Neumann et al. | |
| 2017/0201433 A1 * | 7/2017 | Malatesha | G06F 11/321 |
| 2019/0361896 A1 | 11/2019 | Brunets et al. | |
| 2020/0167732 A1 | 5/2020 | Brieskorn | |
| 2021/0004396 A1 | 1/2021 | Carasso et al. | |
| 2021/0004909 A1 | 1/2021 | Farmer et al. | |
| 2021/0133185 A1 | 5/2021 | Séguin et al. | |
| 2021/0342785 A1 * | 11/2021 | Mann | G06F 3/0484 |
| 2022/0309036 A1 * | 9/2022 | Ballai | G06F 16/125 |
| 2022/0309184 A1 | 9/2022 | Gupta et al. | |
| 2023/0143579 A1 * | 5/2023 | Asgekar | H04L 12/1822 348/14.09 |

* cited by examiner

*Primary Examiner* — A. Hunter Wilder

(74) *Attorney, Agent, or Firm* — Young Basile Hanlon & MacFarlane, P.C.

(57)　　ABSTRACT

Various embodiments of an apparatus, method(s), system(s) and computer program product(s) described herein are directed to an Event Logging Engine. The Event Logging Engine logs event data identifying at least one of: (i) activity of one or more regulated user accounts within a virtual meeting during occurrence of the virtual meeting and (ii) activity of the one or more regulated user accounts with respect to a virtual meeting resource after occurrence of the virtual conference meeting. The Event Logging Engine inserts at least one regulated user account timestamp in the logged event data where each regulated user account is associated with a respective compliance policy. The Event Logging Engine receives a request from an external source for logged event data related to a particular regulated user account. The Event Logging Engine provides access to the logged event data related to one or more timestamps identifying the particular regulated user account.

18 Claims, 8 Drawing Sheets

100

Video
Communication
Platform
140

First User's Client
Device

150

Repository(s)
130

Database(s)
132

Processing Engine
102

Additional Users' Client
Device(s)
160

Processing Engine

102 logging module
154 timestamp module
156 request receiver module
158 access module
160

300

LOG EVENT DATA — 310

INSERT TIMESTAMP — 320

RECEIVE REQUEST — 330

PROVIDE ACCESS — 340

400

500

600

WHITEBOARD EVENT COMPLIANCE

CROSS-REFERENCE TO RELATED APPLICATION(S)

This application is a continuation of U.S. patent application Ser. No. 17/877,891, filed Jul. 30, 2022, the entire disclosure of which is hereby incorporated by reference.

FIELD

Various embodiments relate generally to digital communication, and more particularly, to systems and methods applying and managing compliance policies with regard to virtual meetings hosted by a communication or messaging platform.

SUMMARY

The appended Abstract may serve as a summary of this application.

BRIEF DESCRIPTION OF THE DRAWINGS

The present disclosure will become better understood from the detailed description and the drawings, wherein.

DETAILED DESCRIPTION

Figure 1A:
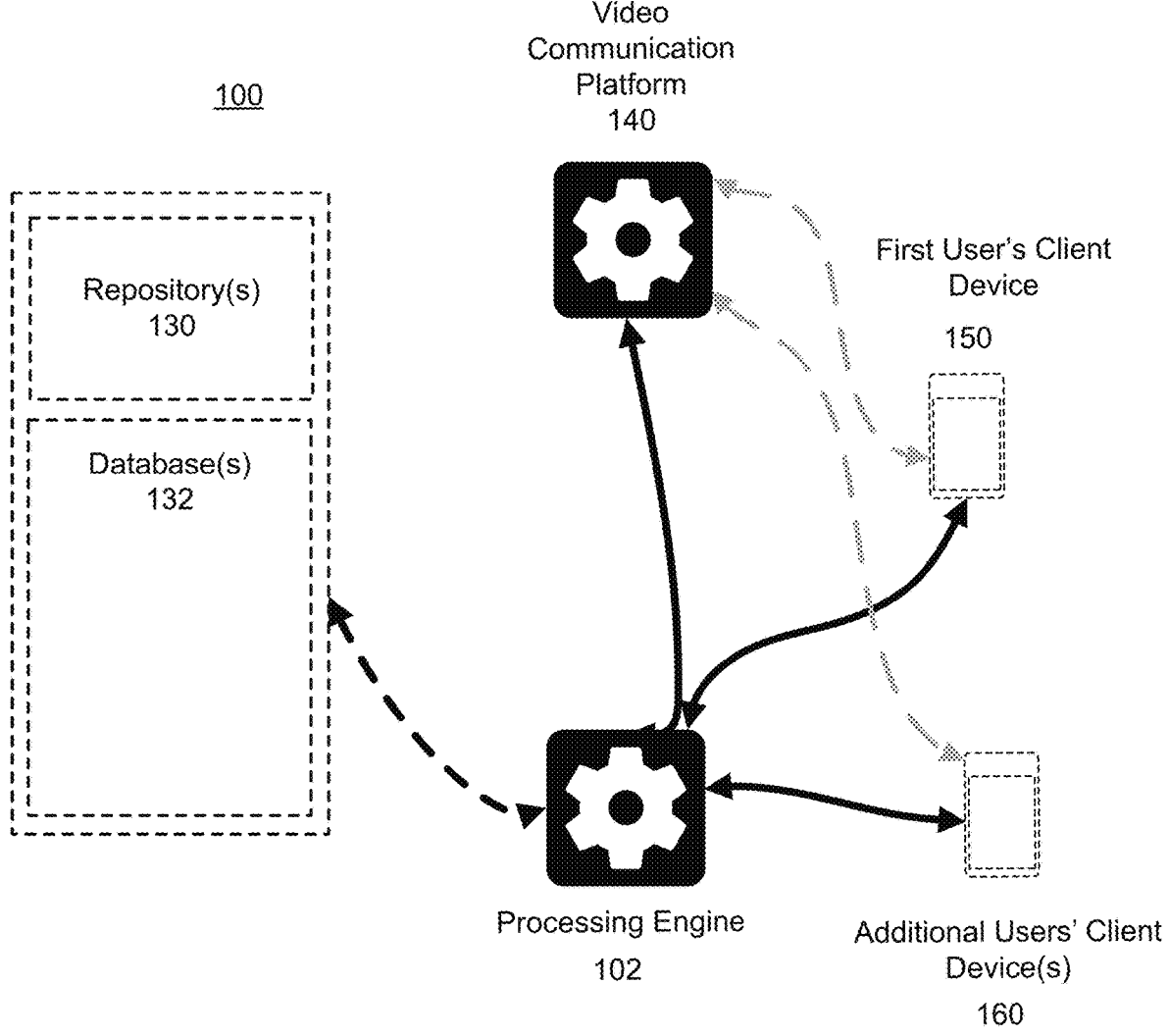
FIG. 1A is a diagram illustrating an exemplary environment in which some embodiments may operate.

Various embodiments of an apparatus, method(s), system(s) and computer program product(s) described herein are directed to an Event Logging Engine.

Various embodiments are directed to a real-time and asynchronous collaboration content area, such as an interactive whiteboard ("whiteboard"). Implementing a whiteboard as a resource accessible to user accounts participating in a virtual meeting creates an engaging and efficient meeting experience. During the virtual meeting, the respective user accounts may apply visual changes to a whiteboard associated with a virtual meeting from any type of computer device. The user accounts may further collaborate after the virtual meeting has concluded by continuing to access and edit, comment, change and annotate various versions of the whiteboard associated with the virtual meeting.

In certain circumstances, a user account accessing the virtual meeting may be a regulated user account in that the user account is associated with a compliance policy. For example, the compliance policy may require that a log of the regulated user account's activities in a virtual meeting should be created and archived. The Event Logging Engine logs event data with respect to activities associated with a regulated user account(s). Embodiments of the Event Logging Engine capture event data regardless of whether events caused by user account activity occurs during the virtual meeting or after the virtual meeting. For example, the Event Logging Engine logs event data that corresponds to user account actions applied to a virtual meeting whiteboard while the virtual meeting is in progress. The Event Logging Engine further logs event data that corresponds to user account actions applied to the same virtual meeting whiteboard when the user accounts continue to access and edit the whiteboard after the virtual meeting has concluded.

In various embodiments, the logged event data falls under various categories, such as whiteboard event data and an audit log. The Event Logging Engine generates whiteboard event data by capturing graphical snapshots of the whiteboard during the virtual meeting and after the virtual meeting.

The Event Logging Engine captures audit log data in response to detecting various types of events—during the virtual meeting and after the virtual meeting as well.

In various embodiments, the Event Logging Engine logs event data identifying at least one of: (i) activity of one or more regulated user accounts within a virtual meeting during occurrence of the virtual meeting and (ii) activity of the one or more regulated user accounts with respect to a virtual meeting resource after occurrence of the virtual conference meeting. The Event Logging Engine inserts at least one regulated user account timestamp in the logged event data where each regulated user account is associated with a respective compliance policy. The Event Logging Engine receives a request from an external source for logged event data related to a particular regulated user account. The Event Logging Engine provides access to the logged event data related to one or more timestamps identifying the particular regulated user account.

In some embodiments, the Event Logging Engine instantiates a virtual meeting participant instance upon detecting the first regulated user account to access the virtual meeting. The Event Logging Engine captures and logs event data via the virtual meeting participant instance.

In various embodiments, the logged event data may be included in archived data. An external data compliance organization may send a request for archived data. The request may identify a particular user account. In response to the request, the Event Logging Engine accesses the logged event data and collects data from the whiteboard event data and/or the audit log data that corresponds to the same particular user account that is identified in the external data compliance organization's request.

It is understood that, according to various embodiments, a whiteboard may be associated with a particular virtual meeting and be accessed and edited after termination of the particular virtual meeting. The same whiteboard may also be accessed during another virtual meeting (such as a subsequent different virtual meeting) and also accessed and edited after that other virtual meeting.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform methods 300 (FIG. 3) or other method herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device (s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
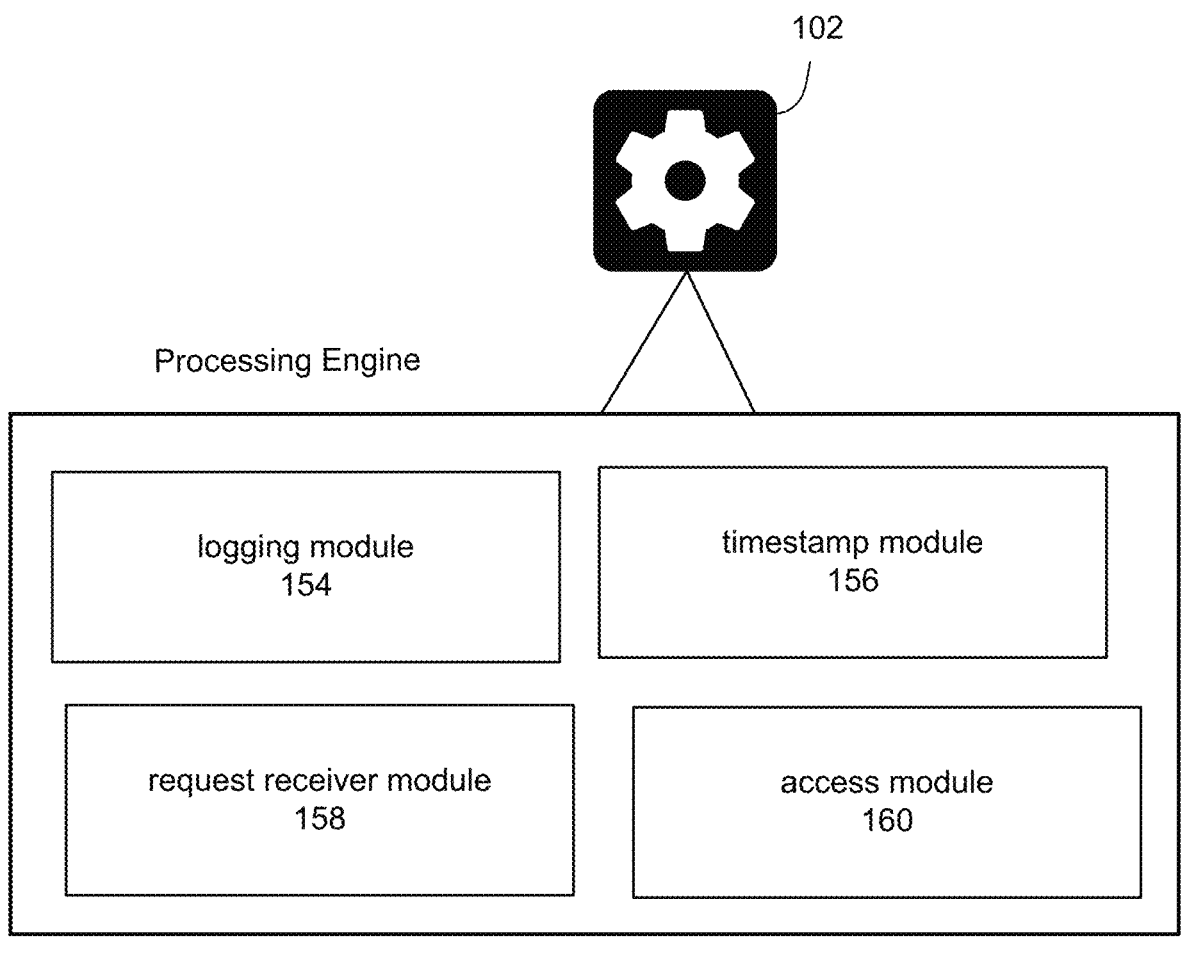
FIG. 1B is a diagram illustrating an exemplary environment in which some embodiments may operate.

FIG. 1B is a diagram illustrating exemplary software modules 154, 156, 158, 160 of a Viseme Engine that may execute at least some of the functionality described herein. According to some embodiments, one or more of exemplary software modules 154, 156, 158, 160 may be part of the processing engine 102. In some embodiments, one or more of the exemplary software modules 154, 156, 158, 160 may be distributed throughout the communication platform 140.

The module 154 functions to log and capture event data.

The module 156 function to insert timestamps.

The module 158 receives requests for logged event data.

The module 160 provides access to the requested logged event data.

The above modules 154, 156, 158, 160 and their functions will be described in further detail in relation to the examples of FIGS. 3, 4, 5, 6.

Figure 2:
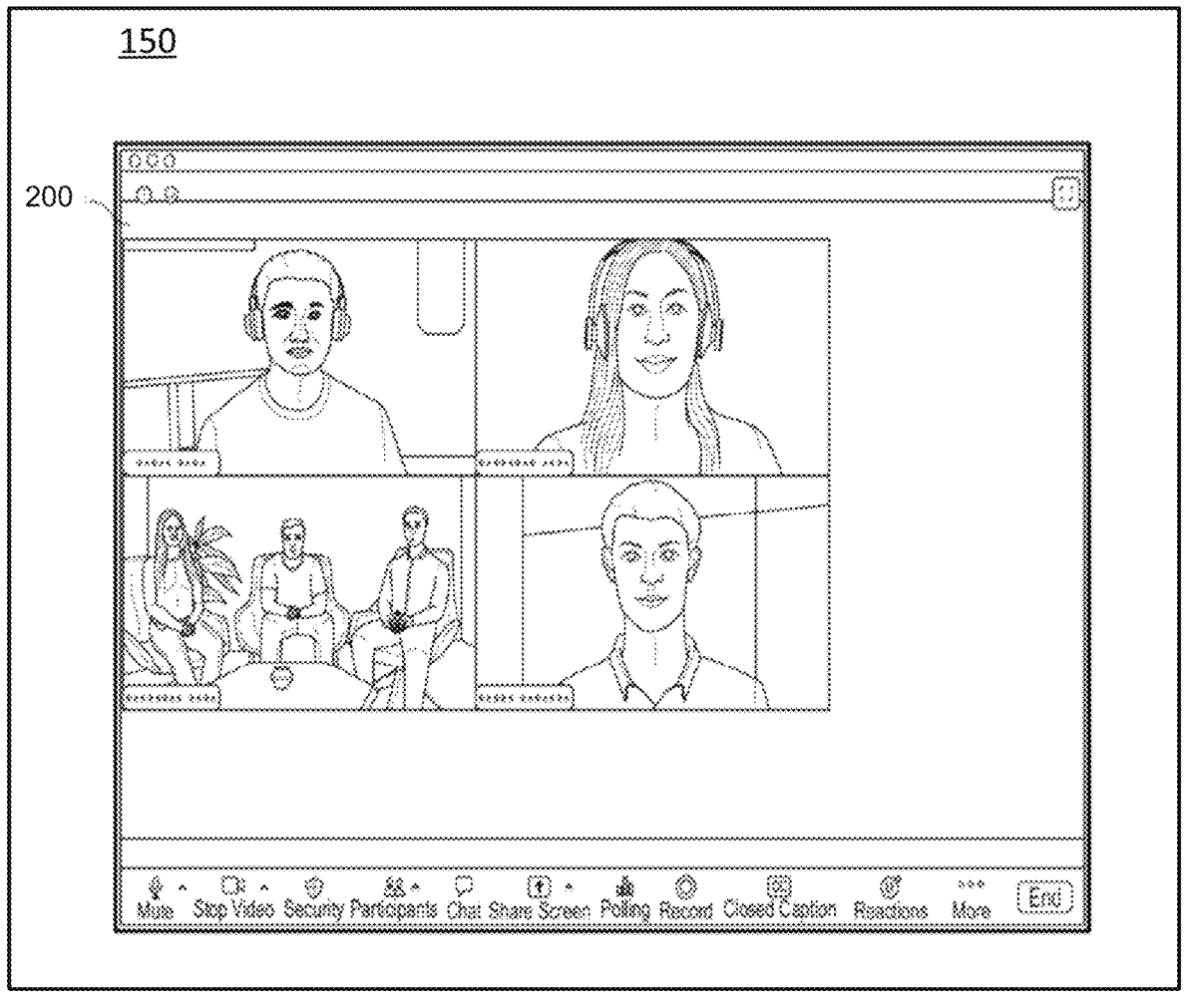
FIG. 2 is a diagram illustrating an exemplary environment in which some embodiments may operate.

As shown in the example of FIG. 2, a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts.

Figure 3:
FIG. 3 is a diagram illustrating an exemplary flowchart according to some embodiments.
Figure 3:
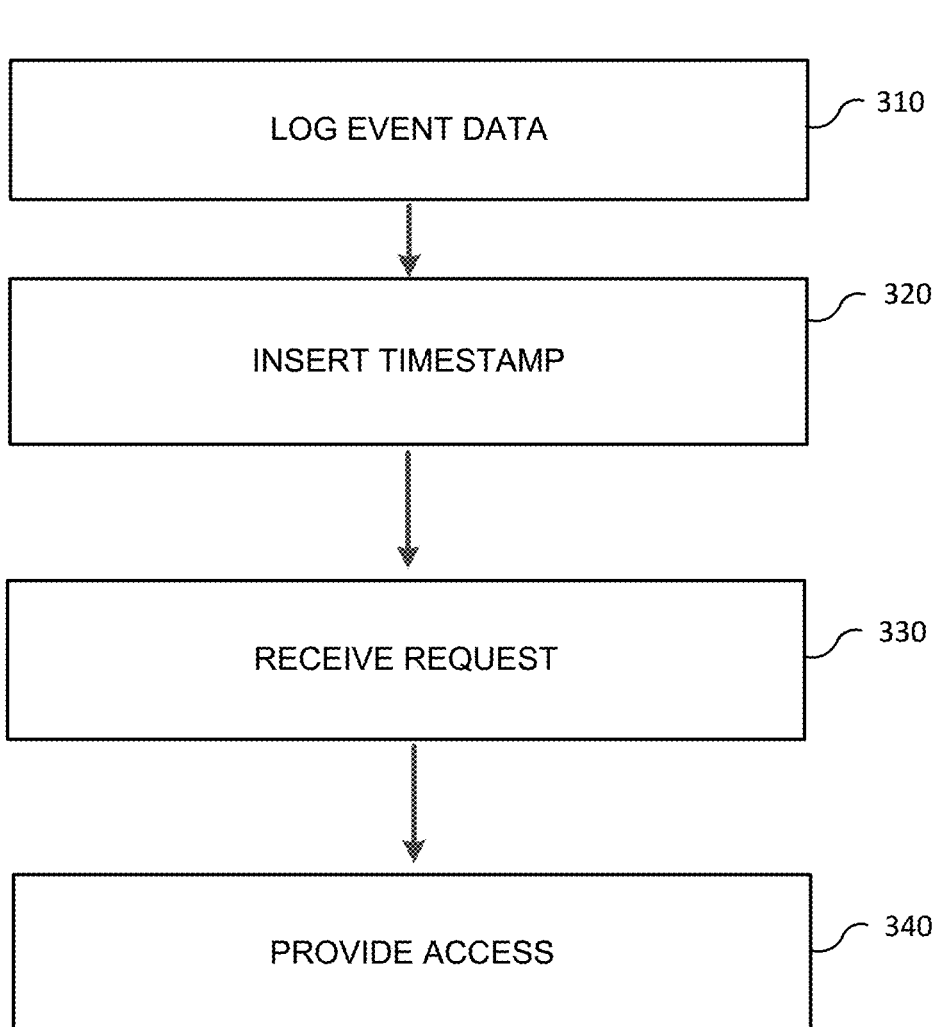

As shown in the example method 300 of FIG. 3, the Event Logging Engine logs event data identifying various activities of regulated user accounts within a virtual meeting during occurrence of the virtual meeting. The further Event Logging Engine logs event data identifying activities of the regulated user accounts with respect to the virtual meeting resource after occurrence of the virtual conference meeting. (Act 310). It is understood that the Event Logging Engine is implemented within the communication platform 140.

According to various embodiments, the Event Logging Engine triggers generation of a virtual meeting participant instance in response to detecting an initial regulated user account being the first regulated account to access the virtual meeting. The Event Logging Engine utilizes the virtual meeting participant instance for capturing the event data with regard to all regulated user accounts that eventually join the virtual meeting. The Event Logging Engine further utilizes the virtual meeting participant instance to present an icon in the virtual meeting whereby the icon indicates when a regulated user account is interacting with the whiteboard. For example, the icon may indicate that a regulated user account is currently applying a visual change to the whiteboard. In another example, the icon may indicate that a regulated user account is currently viewing the whiteboard.

According to one or more embodiments, the virtual meeting participant instance continues to be capture event data during the entirety of the virtual meeting even when all regulated user accounts have left the virtual meeting prior to the conclusion of the virtual meeting. The Event Logging Engine continues to utilize the virtual meeting participant instance to capture event data from user account activities on the whiteboard after the virtual meeting has concluded.

The Event Logging Engine inserts regulated user account timestamps in the logged event data. (Act 320) As the Event Logging Engine captures logged event data, the Event Logging Engine inserts timestamps into the logged event data on a per-regulated user account basis. For example, the logged event data may include captured data with respect to events associated with multiple, different regulated user accounts. The Event Logging Engine inserts timestamps for each portion of logged event data that further identifies which regulated user account is associated that respective portion of logged event data. In some embodiments, the logged event data may further include a start and end time of the logged event associated with a regulated user account identified in the corresponding timestamp. The logged event data may further include a whiteboard identifier.

The Event Logging Engine receives a request from an external source for logged event data related to a particular regulated user account. (Act 330) The request may include an identification of a particular regulated user account. The Event Logging Engine provides access to the logged event data related to one or more timestamps identifying the particular regulated user account. (Act 340)

Figure 4:
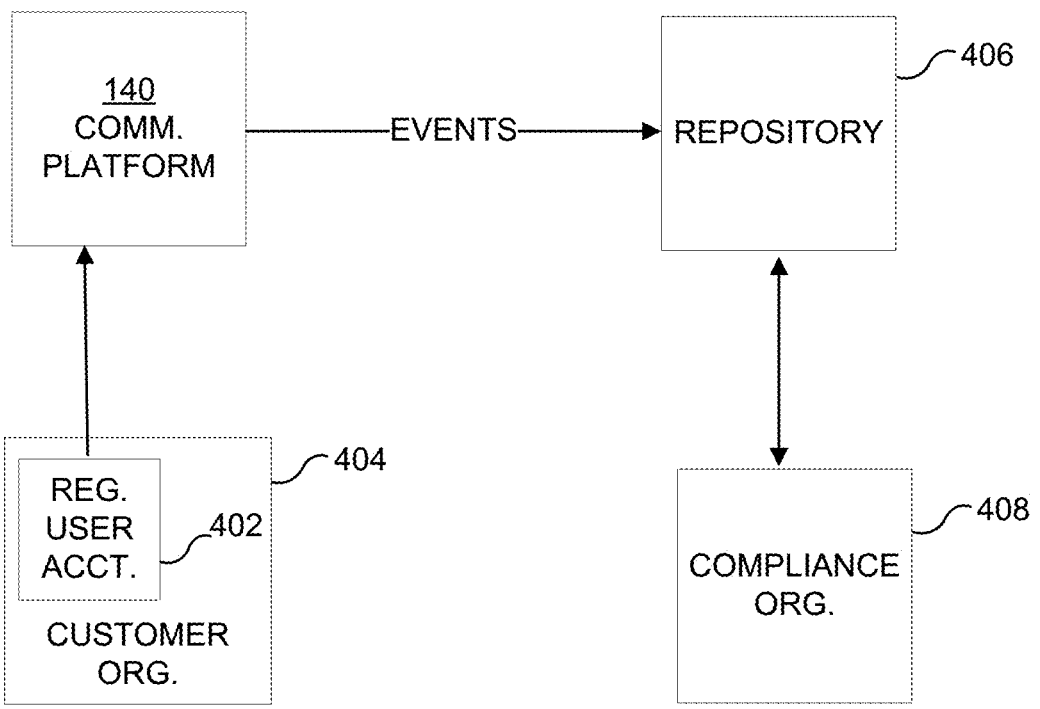
FIG. 4 is a diagram illustrating an exemplary environment in which some embodiments may operate.

As shown in the example diagram 400 of FIG. 4, a regulated user account 402 may correspond to an external customer organization 404 that utilizes the communication platform 140. For example, the external organization 404 may subscribe to services offered via the communication platform 140. One or more regulated user accounts in the communication platform 140 may be associated with and used by individuals (or teams) that belong to the external organization 404.

The external organization 404 may further engage with one or more compliance organizations 408, such as 3rd party vendors the external customer organization 404 has selected to oversee and manage its data archival programs with respect to its regulated user accounts that are subject to various compliance policies. A compliance policy, for example, defines various types of data related to a regulated user account's attendance in a virtual meeting that is to be saved and archived for future reference and/or data compliance purposes. In some embodiments, the external organization may be managing its own data archiving program and may be acting as a "vendor" as described herein In some embodiments, the Event Logging Engine may place the logged event in a repository 406, such as a cloud-based storage location that is accessible to the vendor 408. In some embodiments, the cloud-based storage location may be a temporary cloud-based storage location. In some embodiments, a vendor 408 may utilize a web-hook or an Application Programming Interface (API) to access a link to the logged event data and to permanently store the logged event data within the vendor's data storage and management system. The Event Logging Engine may apply an expiration date (expiration data range) to various portions of logged event data. As such, the vendor 408 may be required to send a request prior to lapse of an expiration date of the requested logged event data in order to be able to access the requested logged event data.

According to various embodiments, multiple regulated user accounts associated with a whiteboard may have participated in the same virtual meeting and further collaborated via the whiteboard after the virtual meeting concluded. Some of the regulated user accounts from the same virtual meeting may further be associated with different external organizations and/or different compliance policies. Vendors 408 requesting logged event data may request different types of logged event data for those regulated user accounts that are governed according to different compliance policies. Requests from a vendor 408 thereby identifies a particular regulated user account. The Event Logging Engine provides access to logged event data associated with respective timestamps that also identify the same regulated user account identified in the vendor's 408 request.

Figure 5:
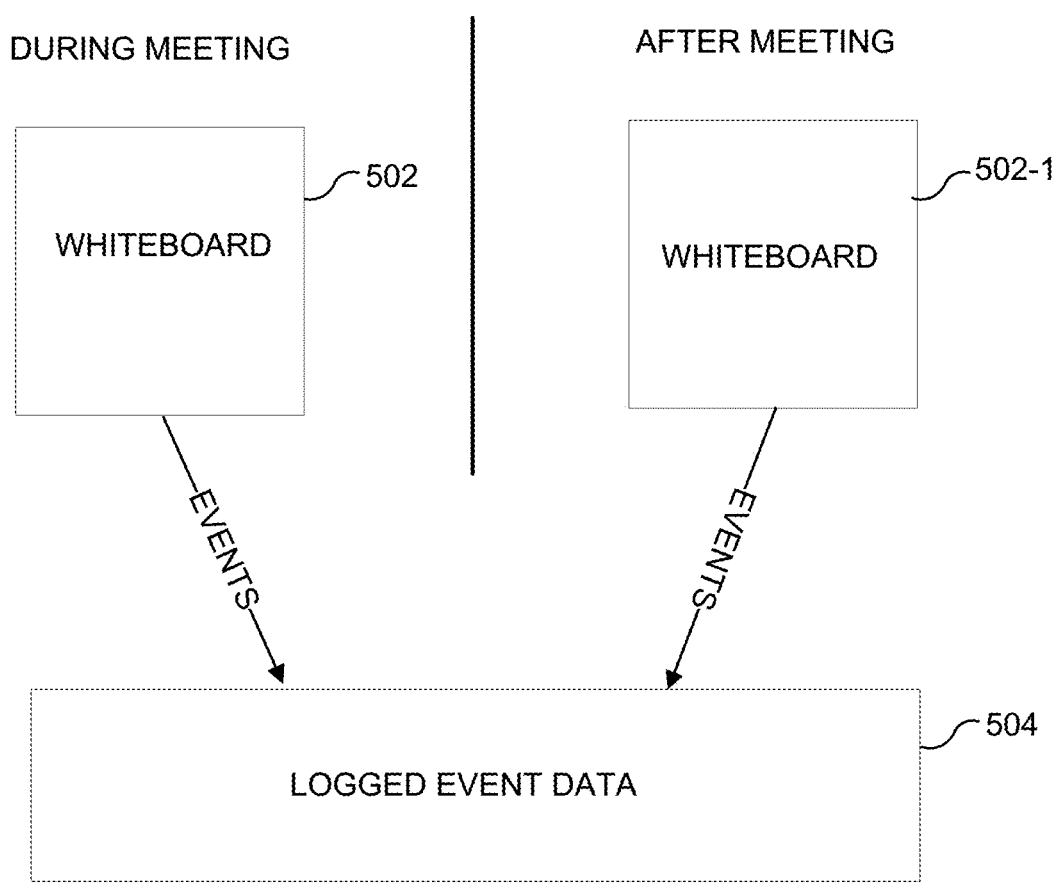
FIG. 5 is a diagram illustrating an exemplary environment in which some embodiments may operate.

As shown in the example diagram 500 of FIG. 5, the Event Logging Engine logs events associated with the whiteboard 502 of a virtual meeting that occur during the virtual meeting. The Event Logging Engine further logs events associated with a version of the same whiteboard 502-1 when a user account(s) accesses the whiteboard 502-1 after the virtual meeting has concluded. It is understood that the whiteboards 502, 502-1 shown in FIG. 5 are the same whiteboard resource associated with the same virtual meeting. In various embodiments, user accounts may access and edit the whiteboard 502-1 after the virtual meeting whereby the accessed whiteboard 502-1 is a different version (or in a different state) than the version of the whiteboard 502 accessed during the virtual meeting.

In some embodiments, the Event Logging Engine initiates the capture of event data when it detects a first regulated user account being an initial regulated user account accessing the virtual meeting. For example, the virtual meeting may commence at a particular start time and only be accessed by non-regulated user accounts. Since no regulated user account has yet accessed the virtual meeting, event data capture by the Event Logging Engine is not triggered. However, a particular regulated user account may be the first regulated user account to access the virtual meeting after it has already commenced. The Event Logging Engine thereby initiates capture of event data in response to detecting participation in the virtual meeting of the first regulated user account.

Figure 6:
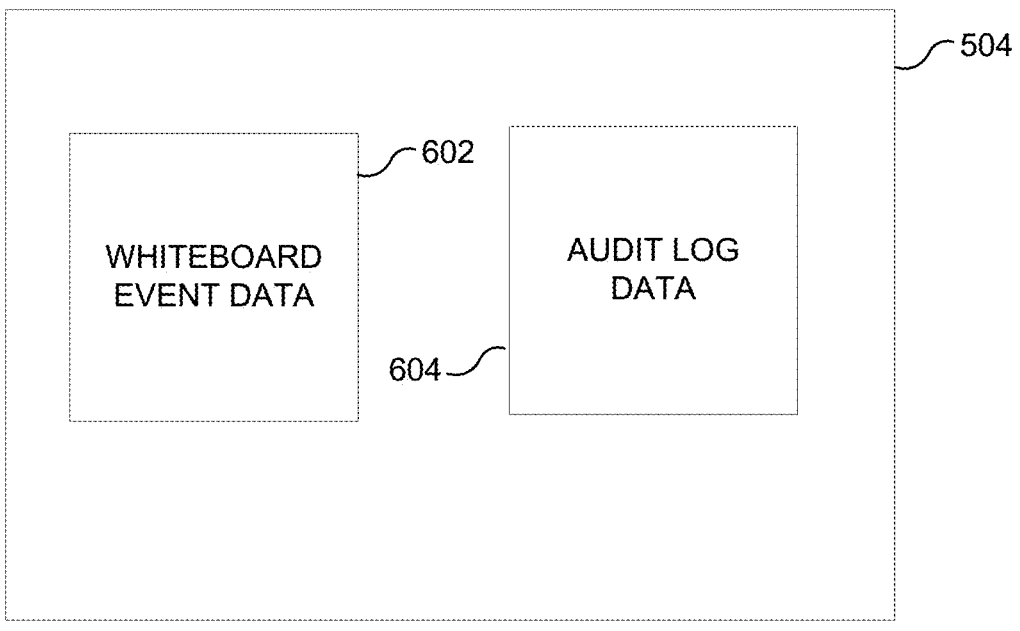
FIG. 6 is a diagram illustrating an exemplary environment in which some embodiments may operate.

As shown in the example diagram 600 of FIG. 6, the Event Logging Engine captures whiteboard event data 602 and audit log data 604. For the whiteboard event data 602, the Event Logging Engine captures respective graphical snapshots of the whiteboard 502, 502-1 at various times during and after the virtual meeting. In some embodiments, each graphical snapshot of the whiteboard 502, 502-1 may be captured in response to detection, by the Event Logging Engine, of a type(s) of whiteboard events performed by a regulated user account. In some embodiments, the Event Logging Engine creates an image file for each captured graphical whiteboard snapshot and places each image file in storage 406. The Event Logging Engine creates a respective link for accessing a stored image file and inserts the respective link in a portion of logged event data 504. In various embodiments, the Event Logging Engine inserts the respective image file link in a portion of whiteboard event data 602 that corresponds to the event that triggered capture of the graphical snapshot that is portrayed in the image file.

Whiteboard events may be associated with an action(s) applied to the whiteboard 502, 502-1 by a user account(s). For example, various types of whiteboard events that prompt capture of a graphical snapshot by the Event Logging Engine include, but are not limited to: whiteboard naming, graphical edits, textual edits, erasure events, whiteboard message and message replies, an upload of an image to the whiteboard 502, 502-1 and any time a regulated user account opens (i.e. initiates access of) the whiteboard 502, 502-1.

In some embodiments, the Event Logging Engine further captures graphical snapshots of the whiteboard 502, 502-1 in response to detection a type(s) of whiteboard events performed by other user accounts—but that were viewed by a regulated user account while the event was being performed. For example, a regulated user account may be accessing a virtual meeting that is also accessed by multiple non-regulated user accounts. A non-regulated user account may apply an action to the whiteboard 502 during the virtual meeting which the Event Logging Engine detects as an event. The regulated user account may view the non-regulated user account's action. For example, the regulated user account may view, in real-time, a graphical edit being performed (i.e. applied) on the whiteboard 502 by the non-regulated user account. The Event Logging Engine captures a graphical snapshot that includes capture of the graphical edit due to the regulated user account viewing of the non-regulated user account's performance of the graphical edit.

In some embodiments, a graphical edit detected by the Event Logging Engine which triggers capture of a respective graphical snapshot of the whiteboard 502, 502-1 may be, for example, when a user account applies a pen tool of the whiteboard 502, 502-1, adds a shape to the whiteboard 502, 502-1 and/or edits a shape previously added to the whiteboard 502, 502-1. Other events that trigger capture of a graphical snapshot further include, for example, detecting when a user account edits text on the whiteboard 502, 502-1 and creates (or edits) an instance of a sticky note functionality applied to the whiteboard 502, 502-1.

For the audit log data 604, the Event Logging Engine captures whiteboard text currently displayed on the whiteboard 502, 502-1 when the event is detected. Captured whiteboard text may include text added to the whiteboard 502, 502-1 during the detected event. The Event Logging Engine further captures an identification of the user account (regulated and/or non-regulated) that created the whiteboard text and an identification of any user account (regulated and/or non-regulated) that viewed the whiteboard text while it was being created (i.e. being applied to the whiteboard 502, 502-1).

Various types of detected events that trigger capture of audit log data 604 include, but are not limited to: whiteboard creation, whiteboard deletion, whiteboard restoration, whiteboard naming, whiteboard sharing and/or permission changes. In some embodiments, initiation of logging event data (both whiteboard event data 602 and audit log data 604) is trigger based on the Event Logging Engine detecting a first regulated user account to initially access the virtual meeting.

In various embodiments, a vendor 408, as illustrated in FIG. 4, may send a request to the communication platform 140 for archived data, that includes the logged event data 504 in storage 406, through an API. In response to the request, the Event Logging Engine accessed the logged event data 504 and returns, for each event that corresponds to a regulated user account identified in the vendor's 408 request, one or more of the following: a whiteboard identifier, a whiteboard name, a uniform resource locator (URL) for the whiteboard, a time of whiteboard creation, detected event identifier, event timestamp, user account that performed the event, whether that user account is regulated or non-regulated, text for the event captured for the audit log, and the link to the image file of a whiteboard graphical snapshot.

Figure 7:
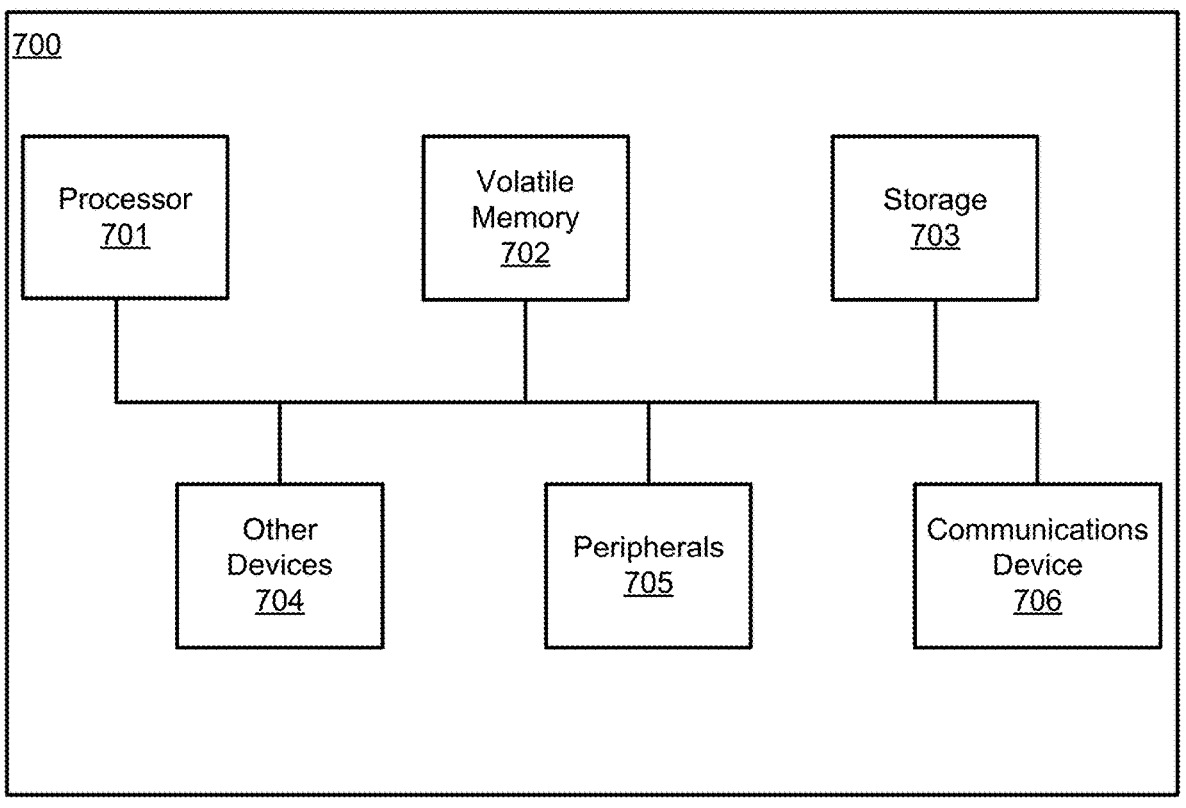
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1: A computer-implemented method comprising: logging event data identifying at least one of: (i) activity of one or more regulated user accounts within a virtual meeting during occurrence of the virtual meeting and (ii) activity of the one or more regulated user accounts with respect to a virtual meeting resource after occurrence of the virtual conference meeting; inserting at least one regulated user account timestamp in the logged event data, each regulated user account associated with a respective compliance policy; receiving a request from an external source for logged event data related to a particular regulated user account; and providing access to the logged event data related to one or more timestamps identifying the particular regulated user account.

Example 2: The method of Example 1, further comprising: wherein the virtual meeting resource comprises: an editable, collaborative whiteboard accessible to one or more virtual meeting participant user accounts during occurrence of the virtual meeting and after occurrence of the virtual meeting; and wherein the event data comprises whiteboard event data comprising: one or more graphical snapshots of the whiteboard, each respective graphical snapshot representing a particular visual change applied to the whiteboard during occurrence of the virtual meeting or after occurrence of the virtual meeting.

Example 3: The method of any Examples 1-2, further comprising: wherein logging event data comprises: capturing a respective graphical snapshot of the whiteboard in response to detecting at least one whiteboard event from a plurality of whiteboard events comprising: a naming or a renaming of the whiteboard, a graphical edit applied to the whiteboard, a textual edit applied to the whiteboard, an erasure event applied to the whiteboard, a whiteboard message creation, a whiteboard message reply creation, an image uploaded to the whiteboard and/or a regulated user account opening the whiteboard.

Example 4: The method of any Examples 1-3, further comprising: wherein the event data further comprises: an audit log; wherein logging event data comprises: capturing audit log data in response to detecting a respective instance of an event type from a plurality of event types comprising: a whiteboard creation event by any respective regulated user account, a whiteboard deletion event by any respective regulated user account, a restoration event restoring the whiteboard to a previous whiteboard version by any respective regulated user account, a whiteboard version naming event by any respective regulated user account, a whiteboard sharing event by any respective regulated user account and/or a whiteboard permission change event by any respective regulated user account.

Example 5: The method of any Examples 1-4, further comprising: wherein capturing audit log data further comprises capturing: whiteboard text, an identification of a respective user account that created the whiteboard text, and/or an identification of each respective user account that viewed the whiteboard text while it was being created.

Example 6: The method of any Examples 1-5, further comprising: wherein logging event data comprises: triggering initiation of logging the event data in response to detecting when a particular regulated user account is a first regulated user account to access the virtual meeting during occurrence of the virtual meeting.

Example 7: The method of any Examples 1-6, further comprising: in response to detection of the first regulated user accessing the virtual meeting, instantiating a virtual meeting participant user account; and capturing and logging the event data via virtual meeting participant user account during and after the occurrence of the virtual meeting.

Example 8: A non-transitory computer-readable medium having a computer-readable program code embodied therein to be executed by one or more processors, the program code including instructions for: logging event data identifying at least one of: (i) activity of one or more regulated user accounts within a virtual meeting during occurrence of the virtual meeting and (ii) activity of the one or more regulated user accounts with respect to a virtual meeting resource after occurrence of the virtual conference meeting; inserting at least one regulated user account timestamp in the logged event data, each regulated user account associated with a respective compliance policy; receiving a request from an external source for logged event data related to a particular regulated user account; and providing access to the logged event data related to one or more timestamps identifying the particular regulated user account.

Example 9: The non-transitory computer-readable medium of Example 8, further comprising: wherein the virtual meeting resource comprises: an editable, collaborative whiteboard accessible to one or more virtual meeting participant user accounts during occurrence of the virtual meeting and after occurrence of the virtual meeting; and wherein the event data comprises whiteboard event data comprising: one or more graphical snapshots of the whiteboard, each respective graphical snapshot representing a particular visual change applied to the whiteboard during occurrence of the virtual meeting or after occurrence of the virtual meeting.

Example 10: The non-transitory computer-readable medium of any Examples 8-9, further comprising: wherein logging event data comprises: capturing a respective graphical snapshot of the whiteboard in response to detecting at least one whiteboard event.

Example 11: The non-transitory computer-readable medium of Example 8-10, further comprising: wherein capturing the respective graphical snapshot of the whiteboard occurs in response to detecting at least one instance of a whiteboard event performed by a respective regulated user account.

Example 12: The non-transitory computer-readable medium of any Examples 8-11, further comprising: wherein capturing the respective graphical snapshot of the whiteboard occurs in response to detecting a respective virtual meeting participant user account is performing an instance of a whiteboard event while a respective regulated user account is currently viewing the whiteboard.

Example 13: The non-transitory computer-readable medium of any Examples 8-12, further comprising: wherein the event data further comprises: an audit log; wherein logging event data comprises: capturing audit log data in response to detecting a respective instance of an event type from a plurality of event types comprising: a whiteboard creation event by any respective regulated user account, a whiteboard deletion event by any respective regulated user account, a restoration event restoring the whiteboard to a previous whiteboard version by any respective regulated user account, a whiteboard version naming event by any respective regulated user account, a whiteboard sharing event by any respective regulated user account and/or a whiteboard permission change event by any respective regulated user account Example 14: The non-transitory computer-readable medium of any Examples 8-13, further comprising: wherein capturing audit log data further comprises capturing: whiteboard text, an identification of a respective user account that created the whiteboard text and/or an identification of each respective user account that viewed the whiteboard text while it was being created.

Example 15: The non-transitory computer-readable medium of any Examples 8-14, further comprising: wherein logging event data comprises: triggering initiation of logging the event data in response to detecting when a particular regulated user account is a first regulated user account to access the virtual meeting during occurrence of the virtual meeting.

Example 16: The non-transitory computer-readable medium of any Examples 8-15, further comprising: wherein logging event data comprises: applying an expiration time range of each respective instance of logged event data.

Example 17: A communication system comprising one or more processors configured to perform the operations of: logging event data identifying at least one of: (i) activity of one or more regulated user accounts within a virtual meeting during occurrence of the virtual meeting and (ii) activity of the one or more regulated user accounts with respect to a virtual meeting resource after occurrence of the virtual conference meeting; inserting at least one regulated user account timestamp in the logged event data, each regulated user account associated with a respective compliance policy; receiving a request from an external source for logged event data related to a particular regulated user account; and providing access to the logged event data related to one or more timestamps identifying the particular regulated user account.

Example 18: The communication system of any Example 17, further comprising: wherein the virtual meeting resource comprises: an editable, collaborative whiteboard accessible to one or more virtual meeting participant user accounts during occurrence of the virtual meeting and after occurrence of the virtual meeting; and wherein the event data comprises whiteboard event data comprising: one or more graphical snapshots of the whiteboard, each respective graphical snapshot representing a particular visual change applied to the whiteboard during occurrence of the virtual meeting or after occurrence of the virtual meeting.

Example 19: The communication system of any Examples 17-18, further comprising: wherein logging event data comprises: capturing a respective graphical snapshot of the whiteboard in response to at least one of: (i) detecting at least one instance of a whiteboard event performed by a respective regulated user account during occurrence of the virtual meeting; and (ii) detecting at least one instance of a whiteboard event performed by a respective regulated user account after occurrence of the virtual meeting.

Example 20: The communication system of any Examples 17-19, further comprising: wherein capturing the respective graphical snapshot further occurs in response to at least one of: (i) detecting a respective virtual meeting participant user account is performing an instance of a whiteboard event, during occurrence of the virtual meeting, while a respective regulated user account is currently viewing the whiteboard; and (ii) detecting a respective virtual meeting participant user account is performing an instance of a whiteboard event, after occurrence of the virtual meeting, while a respective regulated user account is currently viewing the whiteboard.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:

providing, by a communication platform server to one or more first devices, a first whiteboard for one or more first user accounts associated with an organization for which a first compliance policy defining selective content logging is associated;

providing, by the communication platform server to one or more second devices, a second whiteboard for one or more second user accounts associated with a different organization for which a second compliance policy is associated;

generating, by an event logging engine, first timestamped event data by inserting a first timestamp within first logged event data associated with the first whiteboard according to the first compliance policy;

generating, by the event logging engine, second timestamped event data by inserting a second timestamp within second logged event data associated with the second whiteboard according to the second compliance policy;

receiving, by the event logging engine from the one or more first devices, a request for logged event data associated with the first compliance policy;

receiving, by the event logging engine from the one or more second devices, a request for logged event data associated with the second compliance policy;

limiting, by the event logging engine to the one or more first devices, access to the first timestamped event data to accounts associated with the organization according to the first compliance policy;

limiting, by the event logging engine to the one or more second devices, access to the second timestamped event data to accounts associated with the different organization according to the second compliance policy;

logging, by the event logging engine, events associated with the first whiteboard or the second whiteboard when the one or more first user accounts or the one or more second user accounts are accessed after an event associated with the first whiteboard or the second whiteboard are concluded, wherein the logging events include logging event data that is captured with respect to events associated with the organization or the different organization;

generating, by the event logging engine, a different version of the first whiteboard or the second whiteboard when accessed after a virtual meeting is concluded based upon the one or more first user accounts associated with the organization or the one or more second user accounts associated with the different organization; and providing, by the event logging engine to the one or more first devices associated with the organization or the one or more second devices associated with the different organization, access to the logged events with a link to a portion of the logged events logged with timestamps based on the first compliance policy related to the organization or the second compliance policy related to the different organization.

2. The computer-implemented method of claim 1, wherein the communication platform server is configured to facilitate real-time communications between user devices.

3. The computer-implemented method of claim 1, wherein managing data archival, with a third party, of the selective content logging of the first whiteboard for the one or more first user accounts based on the first compliance policy; and wherein managing data archival, with a third party, of the selective content logging of the second whiteboard for the one or more second user accounts based on the second compliance policy.

4. The computer-implemented method of claim 1, wherein event data is logged by identifying one or more of: (i) activity of one or more regulated user accounts within the virtual meeting during occurrence of the virtual meeting, (ii) activity of one or more non-regulated user accounts within the virtual meeting directed at a whiteboard that is associated with an event by any regulated user account, and (iii) activity of the one or more regulated user accounts with respect to the whiteboard after occurrence of the virtual meeting.

5. The computer-implemented method of claim 1, wherein each the first or second whiteboard comprises:

an editable, collaborative whiteboard accessible to one or more participant user accounts during occurrence of the virtual meeting and after occurrence of the virtual meeting; and wherein the event data comprises whiteboard event data comprising: one or more graphical snapshots of the first whiteboard or the second whiteboard, each respective graphical snapshot representing a particular visual change applied to the first whiteboard or the second whiteboard during occurrence of the virtual meeting or after occurrence of the virtual meeting.

6. The computer-implemented method of claim 1, further comprising capturing a respective graphical snapshot of the first whiteboard or the second whiteboard in response to detecting one or more whiteboard events from a plurality of whiteboard events comprising:

(i) a naming or a renaming of the first whiteboard or the second whiteboard;

ii) a graphical edit applied to the first whiteboard or the second whiteboard;

(iii) a textual edit applied to the first whiteboard or the second whiteboard;

(iv) an erasure event applied to the first whiteboard or the second whiteboard;

(v) a whiteboard message creation;

(vi) a whiteboard message reply creation;

(vii) an image uploaded to the first whiteboard or the second whiteboard; and (viii) a regulated user account opening the first whiteboard or the second whiteboard.

7. The computer-implemented method of claim 1, wherein the event data comprises:

(i) a whiteboard creation event;

(ii) a whiteboard deletion event;

(iii) a restoration event restoring a previous whiteboard version;

(iv) a whiteboard version naming event;

(v) a whiteboard sharing event;

(vi) a whiteboard permission change event; and (vii) a sticky note on the first whiteboard or the second whiteboard that edits text or creates texts.

8. The computer-implemented method of claim 1, wherein the event data comprises:

(i) whiteboard text;

(ii) an identification of a user account that created the whiteboard text; and (iii) an identification of each user account that viewed the whiteboard text while it was being created.

9. The computer-implemented method of claim 1, further comprising:

triggering initiation of logging the event data in response to detecting when a particular user account is a first regulated user account to access the virtual meeting during occurrence of the virtual meeting.

10. The computer-implemented method of claim 1, further comprising:

in response to detection of a first regulated user accessing the virtual meeting, instantiating a virtual meeting participant user account; and capturing and logging the event data via the virtual meeting participant user account during and after an occurrence of the virtual meeting.

11. A non-transitory computer-readable medium having a computer-readable program code embodied therein to be executed by one or more processors, the program code including instructions for:

providing, by a communication platform server to one or more first devices, a first whiteboard for one or more first user accounts associated with an organization for which a first compliance policy defining selective content logging is associated;

providing, by the communication platform server to one or more second devices, a second whiteboard for one or more second user accounts associated with a different organization for which a second compliance policy is associated;

generating, by an event logging engine, first timestamped event data by inserting a first timestamp within first logged event data associated with the first whiteboard according to the first compliance policy;

generating, by the event logging engine, second timestamped event data by inserting a second timestamp within second logged event data associated with the second whiteboard according to the second compliance policy;

receiving, by the event logging engine from the one or more first devices, a request for logged event data associated with the first compliance policy;

receiving, by the event logging engine from the one or more second devices, a request for logged event data associated with the second compliance policy;

limiting, by the event logging engine to the one or more first devices, access to the first timestamped event data to accounts associated with the organization according to the first compliance policy;

limiting, by the event logging engine to the one or more second devices, access to the second timestamped event data to accounts associated with the different organization according to the second compliance policy;

logging, by the event logging engine, events associated with the first whiteboard or the second whiteboard when the one or more first user accounts or the one or more second user accounts are accessed after an event associated with the first whiteboard or the second whiteboard are concluded, wherein the logging events include logging event data that is captured with respect to events associated with the organization or the different organization;

generating, by the event logging engine, a different version of the first whiteboard or the second whiteboard when accessed after a virtual meeting is concluded based upon the one or more first user accounts associated with the organization or the one or more second user accounts associated with the different organization; and providing, by the event logging engine to the one or more first devices associated with the organization or the one or more second devices associated with the different organization, access to the logged events with a link to a portion of the logged events logged with timestamps based on the first compliance policy related to the organization or the second compliance policy related to the different organization.

12. The non-transitory computer-readable medium of claim 11, wherein the communication platform server is configured to facilitate real-time communications between user devices;

wherein managing data archival, with a third party, of the selective content logging of the first whiteboard for the one or more first user accounts based on the first compliance policy; and wherein managing data archival, with a third party, of the selective content logging of the second whiteboard for the one or more second user accounts based on the second compliance policy.

13. The non-transitory computer-readable medium of claim 11, wherein the event data comprises whiteboard event data comprising one or more graphical snapshots of the first whiteboard or the second whiteboard, each respective graphical snapshot representing a particular visual change applied to the first whiteboard or the second whiteboard during occurrence of a virtual meeting or after occurrence of the virtual meeting.

14. The non-transitory computer-readable medium of claim 11, wherein event data is logged by identifying one or more of: (i) activity of one or more regulated user accounts within the virtual meeting during occurrence of the virtual meeting, (ii) activity of one or more non-regulated user accounts within the virtual meeting directed at a whiteboard that is associated with an event by any regulated user account, and (iii) activity of the one or more regulated user accounts with respect to the whiteboard after occurrence of the virtual meeting.

15. The non-transitory computer-readable medium of claim 11, wherein the first or second whiteboard comprises:

an editable, collaborative whiteboard accessible to one or more participant user accounts during occurrence of the virtual meeting and after occurrence of the virtual meeting; and wherein the event data comprises whiteboard event data comprising: one or more graphical snapshots of the first whiteboard or the second whiteboard, each respective graphical snapshot representing a particular visual change applied to the first whiteboard or the second whiteboard during occurrence of the virtual meeting or after occurrence of the virtual meeting.

16. The non-transitory computer-readable medium of claim 11, the program code further including instructions for capturing a respective graphical snapshot of the first whiteboard or the second whiteboard in response to detecting one or more whiteboard events from a plurality of whiteboard events comprising:

(i) a naming or a renaming of the first whiteboard or the second whiteboard;

ii) a graphical edit applied to the first whiteboard or the second whiteboard;

(iii) a textual edit applied to the first whiteboard or the second whiteboard;

(iv) an erasure event applied to the first whiteboard or the second whiteboard;

(v) a whiteboard message creation;

(vi) a whiteboard message reply creation;

(vii) an image uploaded to the first whiteboard or the second whiteboard; and (viii) a regulated user account opening the first whiteboard or the second whiteboard.

17. A communication system comprising one or more processors configured to:

provide, by a communication platform server to one or more first devices, a first whiteboard for one or more first user accounts associated with an organization for which a first compliance policy defining selective content logging is associated;

provide, by the communication platform server to one or more second devices, a second whiteboard for one or more second user accounts associated with a different organization for which a second compliance policy is associated;

generate, by an event logging engine, first timestamped event data by inserting a first timestamp within first logged event data associated with the first whiteboard according to the first compliance policy;

generate, by the event logging engine, second timestamped event data by inserting a second timestamp within second logged event data associated with the second whiteboard according to the second compliance policy;

receive, by the event logging engine from the one or more first devices, a request for logged event data associated with the first compliance policy;

receive, by the event logging engine from the one or more second devices, a request for logged event data associated with the second compliance policy;

limit, by the event logging engine to the one or more first devices, access to the first timestamped event data to accounts associated with the organization;

limit, by the event logging engine to the one or more second devices, access to the second timestamped event data to accounts associated with the different organization;

log, by the event logging engine, events associated with the first whiteboard or the second whiteboard when the one or more first user accounts or the one or more second user accounts are accessed after an event associated with the first whiteboard or the second whiteboard are concluded, wherein the logging events include logging event data that is captured with respect to events associated with the organization or the different organization;

generate, by the event logging engine, a different version of the first whiteboard or the second whiteboard when accessed after a virtual meeting is concluded based upon the one or more first user accounts associated with the organization or the one or more second user accounts associated with the different organization; and provide, by the event logging engine to the one or more first devices associated with the organization or the one or more second devices associated with the different organization, access to the logged events with a link to a portion of the logged events logged with timestamps based on the first compliance policy related to the organization or the second compliance policy related to the different organization.

18. The communication system of claim 17, wherein event data is logged by identifying (i) activity of one or more regulated user accounts within the virtual meeting during occurrence of the virtual meeting, (ii) activity of one or more non-regulated user accounts within the virtual meeting directed at a whiteboard that is associated with an event by any regulated user account, and (iii) activity of the one or more regulated user accounts with respect to the whiteboard after occurrence of the virtual meeting.

* * * * *